US009529499B2

United States Patent
Scheufler et al.

(10) Patent No.: US 9,529,499 B2
(45) Date of Patent: Dec. 27, 2016

(54) MORPHABLE PAD FOR TACTILE CONTROL

(71) Applicant: Honda Motor Co., Ltd., Tokyo (JP)

(72) Inventors: Nicholas A. Scheufler, Dublin, OH (US); Steven Feit, Dublin, OH (US); Dave Jaeyeong Choi, Utsunomiya (JP); Ross C. Miller, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 14/564,882

(22) Filed: Dec. 9, 2014

(65) Prior Publication Data

US 2015/0153915 A1 Jun. 4, 2015

Related U.S. Application Data

(63) Continuation of application No. 13/515,433, filed as application No. PCT/US2010/059700 on Dec. 9, 2010, now Pat. No. 8,954,848.

(Continued)

(51) Int. Cl.
  *G06F 3/048* (2013.01)
  *G06F 3/0482* (2013.01)
  (Continued)

(52) U.S. Cl.
  CPC ............ *G06F 3/0482* (2013.01); *B60K 35/00* (2013.01); *B60K 37/06* (2013.01); *G06F 3/016* (2013.01);
  (Continued)

(58) Field of Classification Search
  CPC .................................................. G06F 3/0482
  (Continued)

(56) References Cited

U.S. PATENT DOCUMENTS 6,253,131 B1 * 6/2001 Quigley ............... B60R 16/027
  340/461
6,360,149 B1 * 3/2002 Kwon ................... B60K 35/00
  114/144 R (Continued)

FOREIGN PATENT DOCUMENTS

| DE | 4443912 | 6/1996 |
|---|---|---|
| EP | 0893297 | 1/1999 |
| JP | 2010102508 | 5/2010 |

OTHER PUBLICATIONS

Office Action of JP Serial No. 2014-544645 Dec. 8, 2015, 5 pages.

(Continued)

*Primary Examiner* — William Titcomb
(74) *Attorney, Agent, or Firm* — Rankin, Hill & Clark LLP

(57) ABSTRACT

A system and method are disclosed for a morphable pad and display configured for tactile control. The system comprises a display for displaying a user interface comprising a layout of vehicle control features. The display is configured to highlight a portion of the layout associated with a received highlight input, and to update the layout based on a received selection input. A morphable pad is connected to the display and comprises an array of switches. Each switch is configured to receive highlight input and selection input. The switches are also configured to adjust in tactile feel to match the layout, and to reconfigure in tactile feel responsive to a change in the layout.

20 Claims, 10 Drawing Sheets

Related U.S. Application Data

(60) Provisional application No. 61/288,203, filed on Dec. 18, 2009.

(51) Int. Cl.

| | | |
|---|---|---|
| *B60K 35/00* | (2006.01) | |
| *B60K 37/06* | (2006.01) | |
| *G06F 3/01* | (2006.01) | |
| *G06F 3/041* | (2006.01) | |
| *G06F 3/0488* | (2013.01) | |
| *G06F 3/0354* | (2013.01) | |
| *G06F 3/0484* | (2013.01) | |

(52) U.S. Cl.
CPC ......... *G06F 3/03547* (2013.01); *G06F 3/0414* (2013.01); *G06F 3/04842* (2013.01); *G06F 3/04883* (2013.01); *B60K 2350/1032* (2013.01); *B60K 2350/1072* (2013.01); *G06F 2203/04808* (2013.01); *G06F 2203/04809* (2013.01)

(58) Field of Classification Search
USPC .......................................................... 715/765
See application file for complete search history.

(56) References Cited

U.S. PATENT DOCUMENTS

| | | | | |
|---|---|---|---|---|
| 6,373,472 | B1* | 4/2002 | Palalau | B60K 37/02 345/156 |
| 6,424,337 | B1* | 7/2002 | Eriksson | B60K 37/06 345/156 |
| 6,429,846 | B2 | 8/2002 | Rosenberg et al. | |
| 6,809,462 | B2* | 10/2004 | Pelrine | A63H 3/365 310/319 |
| 7,245,292 | B1 | 7/2007 | Custy | |
| 7,602,384 | B2* | 10/2009 | Rosenberg | A63F 13/06 178/18.01 |
| 8,188,844 | B2* | 5/2012 | Lenneman | B60K 37/06 310/328 |
| 8,302,022 | B2* | 10/2012 | Tauchi | G06F 3/016 345/156 |
| 8,310,349 | B2* | 11/2012 | Pfau | H04M 1/23 340/12.54 |
| 8,473,115 | B2* | 6/2013 | Nezu | G01C 21/36 340/815.6 |
| 8,516,372 | B2* | 8/2013 | Seeger | H01H 25/06 715/713 |
| 2002/0054060 | A1* | 5/2002 | Schena | G01D 7/007 715/701 |
| 2005/0024342 | A1 | 2/2005 | Young | |
| 2012/0299832 | A1* | 11/2012 | Peterson | G06F 3/0202 345/168 |

OTHER PUBLICATIONS

Office Action of JP Serial No. 2014-544645 Dec. 8, 2015, 6 pages (English Translation).
Summons to Attend Oral Proceedings Pursuant to Rule 115(1) EPC of EP App. No. 10838146.8 dated Apr. 12, 2016, 13 pages.
Office Action for Japanese Patent Application No. JP 2012-544645, Mar. 24, 2015, 8 Pages.
Communication pursuant to Article 94(3) EPC for European Patent Application No. EP 10838146.8, Apr. 24, 2015, 9 Pages.
Office Action for Chinese Patent Application No. CN 2010800554816, Jan. 16, 2015, 13 Pages.

* cited by examiner

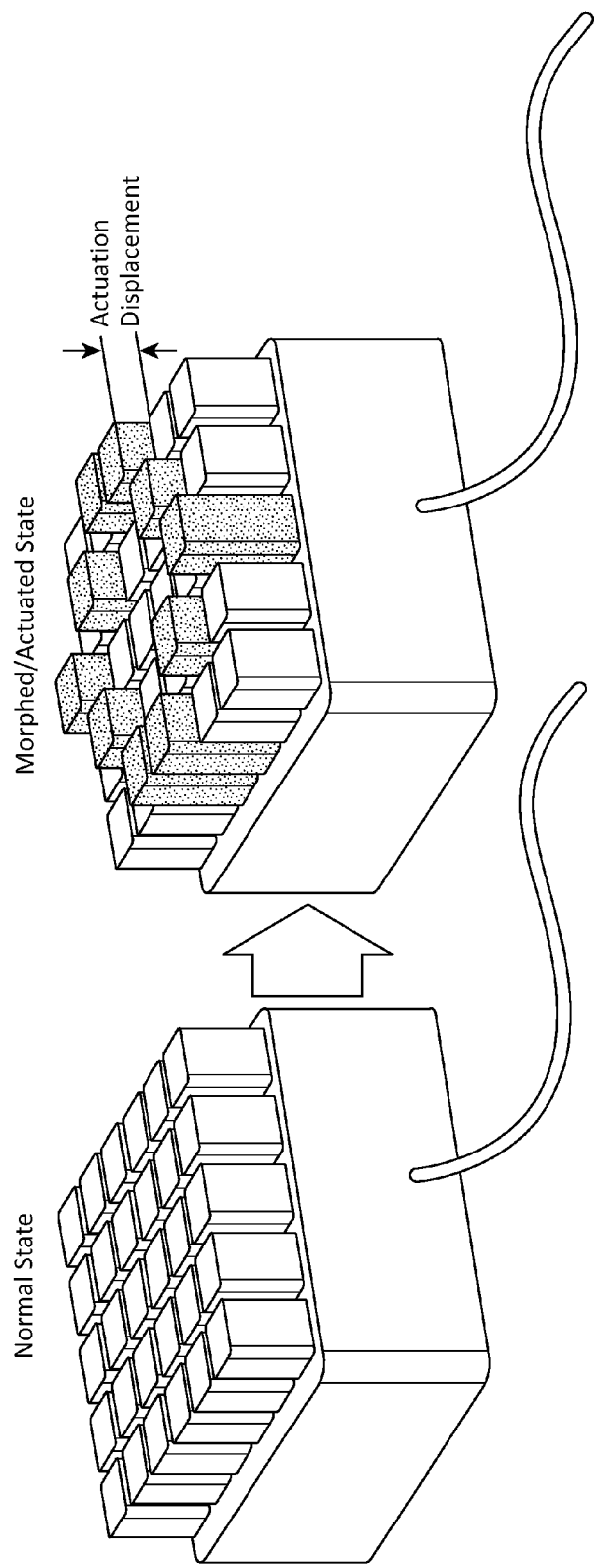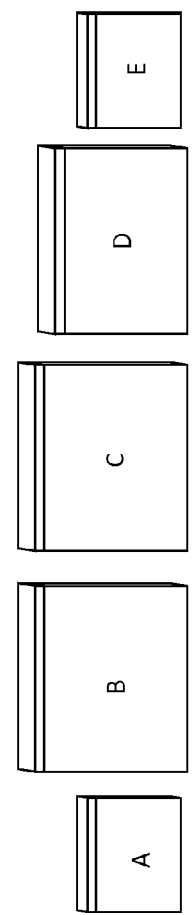
FIG. 4a
FIG. 4b

MORPHABLE PAD FOR TACTILE CONTROL

RELATED APPLICATIONS

This application is a continuation of co-pending U.S. application Ser. No. 13/515,433, which is the National Stage of International Application No. PCT/US2010/059700, filed Dec. 9, 2010 and which claims the benefit of U.S. Provisional Application No. 61/288,203, filed Dec. 18, 2009 the contents of which are incorporated by reference herein in their entirety.

FIELD OF THE INVENTION

The embodiments described herein relate to the field of vehicle interfaces and more particularly to dynamic input interfaces in a vehicle.

BACKGROUND OF THE INVENTION

Modern vehicles, such as cars, have a significant number of features built in, which drivers or passengers can make use of Each feature has its own knobs, buttons, or dials associated with it for the user to control in order to adjust the feature. A modern car stereo, for example, has many different buttons for controlling the AM/FM radio, including a dial for controlling the volume, scan and seek functions for switching between radio channels, and preset channel selection buttons to retrieving favorite radio stations.

Some modern cars now incorporate touch sensitive display devices to replace the multitude of controls associated with car features. Touch sensitive displays, however, do not provide physical feedback to the user. As a result, the user must look at the display in order to ensure that the proper touch input is received. Thus, the complexity of operating many different car controls control has been replaced by the need for a driver to constantly divert their gaze from the road in order to control car features.

SUMMARY OF THE INVENTION

One embodiment of the present invention comprises a morphable pad and display device allowing a user to control car features. The display device that displays a user interface comprising a layout of the various controls associated with each feature installed in the car. The morphable pad is configured to adjust the tactile feel of numerous independent switches to match the layout of car control features of the user interface displayed on the display device in response to receiving a selection input, typically a switch press. The function performed by pressing each switch is configured based on the displayed user interface. The display device uses the selection input to update the layout of the user interface and morphable pad appropriately based on the input, and adjust the car feature associated with that portion of the user interface.

The switches of the morphable pad are additionally configured to receive a highlight input from a user, where the highlight input is generally insufficient in tactile pressure to activate any of the switches of the morphable pad. The highlight input is used to highlight the portion of the user interface corresponding to the switches the user is touching or is in close proximity to.

An advantage of one embodiment of the present invention is that it removes the need for the vast array of different controls that are present in many cars. Rather, the combination of the morphable pad and display provide a space efficient and intuitively understandable system for controlling car features. The morphable pad and display can be associated with any type of car feature either currently existing or developed in the future, without any change in structure.

Another benefit is the ability to optimize the location of both the morphable pad and the display device. The morphable pad can be placed in the center console, or another ergonomically convenient area, while the display can be located closer to a driver's line of sight while driving. Further, the morphable pad and display are designed to allow the user to control car features while minimizing the need to look at the morphable pad. As a result of physically morphing the morphable pad to match the layout of the user interface, the user can control the user interface by feel rather than solely by sight. A driver may then control car features while keeping their gaze focused on the road.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4a contains an illustration of a morphable pad in accordance with one embodiment of the present invention.

FIG. 4b illustrates a side view of a morphable pad switch array with switches positioned at several different heights.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION OF THE INVENTION

Figure 1:
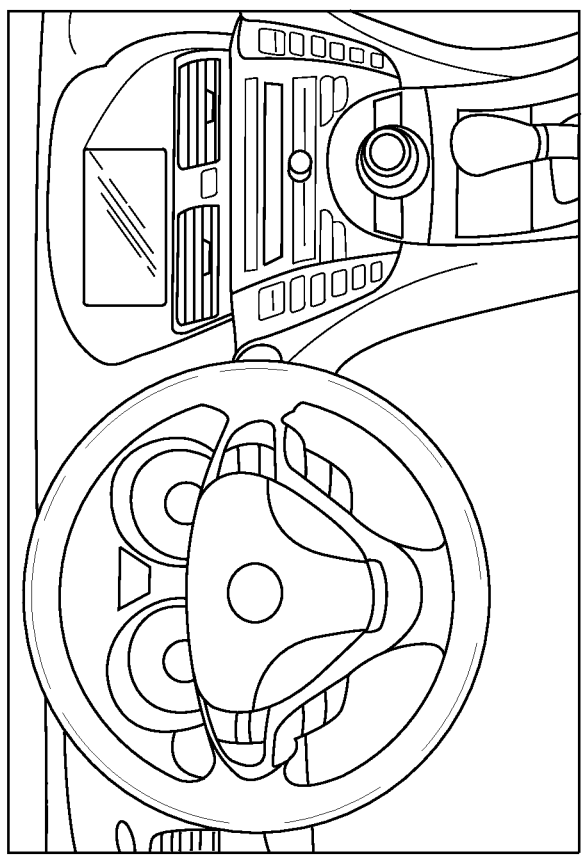
FIG. 1 is an illustration of a typical car interior from the driver's point of view, illustrating the various controls for car features that fill the center console and steering wheel of many cars.

FIG. 1 is an illustration of a typical car interior from the driver's point of view, illustrating the various controls for car features that fill the center console and steering wheel of many cars. Car interiors are designed to place the controls of each car feature within reach of the driver, so that they can operate the controls while driving and without the assistance of a passenger. As a result of these requirements, there is a limited space in which controls can be placed and easily manipulated by a driver. Examples of car features a driver or passenger may wish to control include car stereos, navigation systems, temperature adjustment, car door locks, rear-seat DVD players, air conditioning, cruise control, automatic parking assist, heated seats, sunroof, road-side assistance, smart phone interoperability, social networking functions, or third party software applications (or "apps") among others. It is preferable to reduce the amount of time a driver is not looking at the road while controlling vehicle features.

Figure 2:
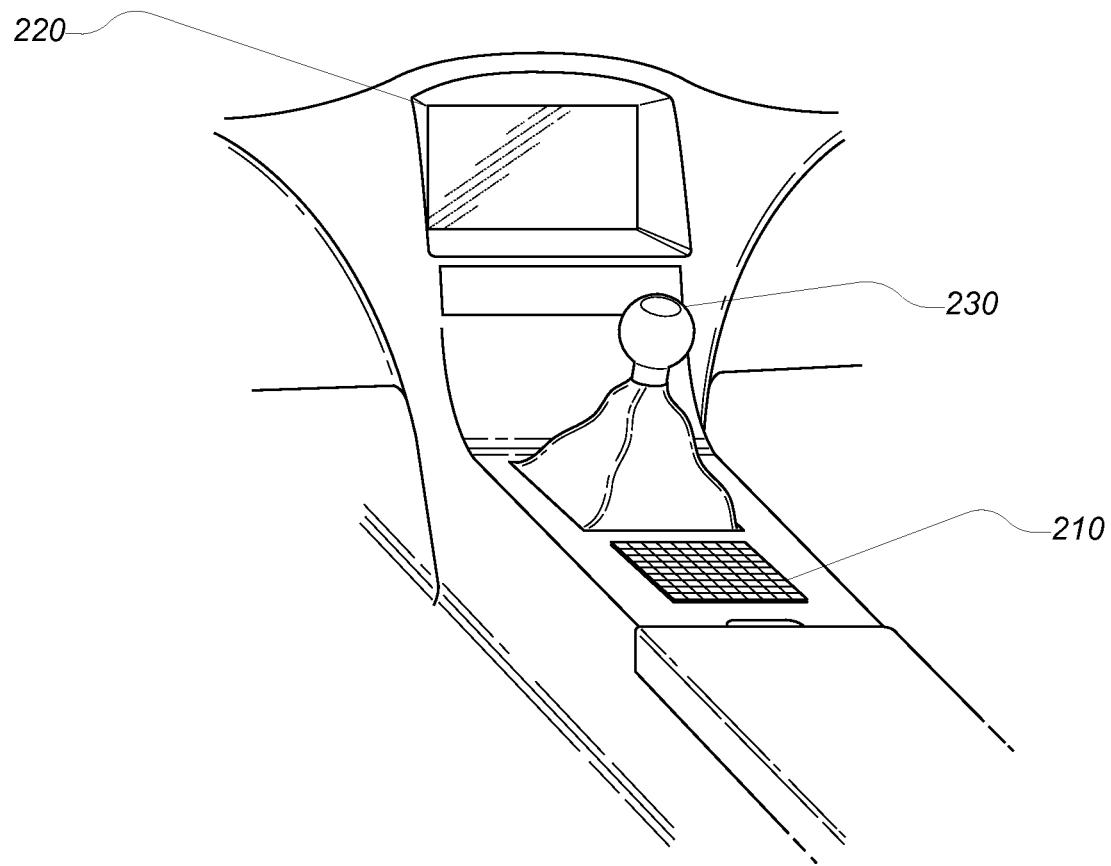
FIG. 2 is an illustration of a car interior from the driver's point of view comprising a morphable pad and display for tactile control in accordance with one embodiment of the present invention.

FIG. 2 is an illustration of a car interior from the driver's point of view comprising a morphable pad and display for tactile control in accordance with one embodiment of the present invention. In contrast to FIG. 1, many of the controls has been replaced by the morphable pad 210.

The morphable pad 210 is responsible for receiving all or most user input necessary for controlling car features. As the morphable pad 210 replaces separate controls associated with car features, it may be placed anywhere within convenient reach of the driver. FIG. 2 illustrates that the morphable pad 210 is placed on the side of the shifter 230 closer to the back of the car, however this placement is just an example. In another example, the morphable pad 210 may be located on the raised portion of the center stack (otherwise referred to as the center console) below the display 220. The morphable pad 210 may also be located above the display 220. The morphable pad 210 is electrically connected to the display 220. The morphable pad 210 transmits received user input to the display 220. In some embodiments, the user input received at the morphable pad 210 is transmitted to an electronic control unit (ECU) (not shown), which then transmits the user input to the display 220.

The display 220 displays a user interface comprising a layout of the controls that the user can adjust to alter the behavior of various car features. The display 220 adjusts the layout of the user interface responsive to user input received from the morphable pad 210. In some embodiments, the display 220 also adjusts the function of car features responsive to the received user input. In other embodiments, the ECU handles the adjustment of car features.

The morphable pad 210 and the display 220 are configured, e.g. are synchronized, to match each other such that the physical shape of the array of switches that makes up the morphable pad 210 matches the layout of car feature controls displayed as part of the user interface on the display 220. As input is received from the user at the morphable pad 210, the display 220 adjusts, e.g. is reconfigured or resynchronized, to modify the layout of the user interface based on the input. The morphable pad 210 responds to this, and is adjusted (or "morphed") to match the new version of the user interface displayed on the display 220. In one embodiment, the morphable pad 210 and the display 220 are collocated in single apparatus.

Figure 3:
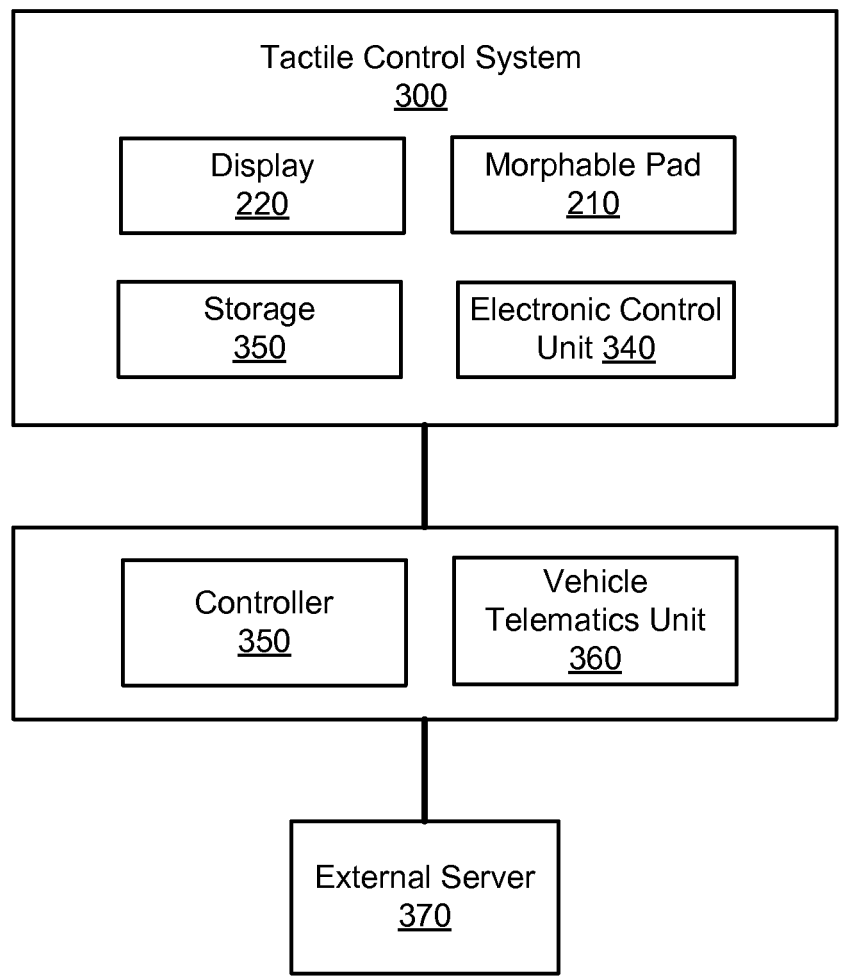
FIG. 3 is a system diagram for a tactile control system for car features in accordance with one embodiment of the present invention.

FIG. 3 is a system diagram for a tactile control system for controlling car features in accordance with one embodiment of the present invention. The tactile control system 300 comprises a morphable pad 210, a display 220, a storage 350, and an ECU 340. In one embodiment, the components of the tactile control system 300 are electrically connected by wires or circuitry running through a vehicle.

The storage 350 stores information related to the car features, including the settings for each car feature. For example, the temperature control of the car may include a range of temperature which the car is capable in the car interior, through various mechanisms such as air conditioning, air entering the car, or a car heater. In this example, the storage 350 would comprise the range of temperature which the car is capable producing for the interior of the car. The user's input would be used to determine at what internal temperature to set the temperature control.

The storage 350 additionally comprises the various layouts of the user interface for car features. Elements of the user interface stored in the storage may include user interface graphics, user interface button sizes, shapes, and layouts, as well as user interface highlighting information. The storage 350 additionally comprises the connections between user interface elements such that whenever the morphable pad 310 receives input from the user, the currently displayed user interface is properly updated to the relevant layout responsive to the input received. The storage may be comprised of a computer readable storage medium, different example embodiments of which are illustrated below.

In one embodiment, the user may modify or customize the appearance or control of the user interface element of a car feature control. The customization may involve merely altering the appearance of a layout of the user interface of a car feature control, or it may involve changing how the user adjusts the car feature control. For example, an appearance change may adjust a car stereo volume feature from a vertical volume button, to a circular knob. In another example, a control change may adjust a car stereo volume feature from a continuously varying range, to a plurality of discrete volume levels.

The ECU 340 is configured to adjust car features responsive to received user inputs. The ECU 340 translates received user inputs into adjustments to be made to car features. For example, a user input may indicate that the temperature on the interior of the car should be increased. The ECU 340 communicates with other car subcomponents (not shown) to implement the adjustment of car features. In some embodiments, the ECU 340 additionally communicates between the morphable pad 210 and the display 220, to ensure that both maintain a matched state after receiving user input. In other embodiments, the display 220 performs these functions instead of the ECU.

In one embodiment, the tactile control system 300 is controlled externally through an external server 370. In this embodiment, the external server 370 performs all of the functions of the ECU 340 and storage 350 described above, effectively replacing them. The tactile control system 300 communicates with the external server 370 through a controller 350 and a vehicle telematics unit 360. The vehicle telematics unit 360 may communicate with the external server 370 through any number of communication protocols including, for example, SMS messaging, radio communication, wireless communication standards.

FIG. 4 contains several illustrations of a morphable pad in accordance with one embodiment of the present invention. The morphable pad 210 comprises an array of switches, each of which is capable of achieving a variable, independent range of height. By adjusting the height of switches independently from one another, the morphable pad 210 is able to mimic the outline of the controls of car features displayed in the user interface. As a result, a user can interact with the user interface by sense of touch on the morphable pad 210. Although the user may look at the display 220 to determine which feature to adjust, eventually the user may use the morphable pad 210 exclusively (i.e. in a "blind" manner) to control car features.

The morphable pad 210 receives layout information representing the user interface. The switches of the morphable pad 210 are capable of being positioned at many different heights in order to accurately reproduce the layout of the user interface. FIG. 4a illustrates a morphable pad 210 in a normal state prior to turning on the vehicle or activating the user interface on the display 220. FIG. 4a also illustrates the morphed/actuated state in which the morphable pad 210 is matching the displayed user interface by reforming its physical structure to create a physical representation of the user interface.

FIG. 4b illustrates a side view of a morphable pad 210 switch array with switches positioned at several different heights. The differential heights of the switches of the array results in physical contours which the user can distinguish by sense of touch. For example, a raised switch or series of raised switches (depending upon switch density) may indicate a button on the user interface. By detecting the physical pattern of raised switches, and by memorizing the user interface associated with that switch layout, the user can determine by sense of touch which switch or series of switches to press to activate the desired portion of the user interface. FIG. 4b also illustrates that the top portion of each switch comprises a surface for receiving highlight input from a user.

The array of switches may be of variable shape. In the sample embodiment illustrated in FIG. 4a, the layout of the array of switches is a square grid with 30 switches total (5×6). However, the morphable pad 210 is not limited to this layout. In other embodiments, the array of switches may be laid out in a rectangular, circular, or other polygonal fashion. The layout of the morphable pad 210 is variable so that the morphable pad 210 may be used with displays 220 and user interfaces of varying shape.

The array of switches may also be of varying density. In the sample embodiment illustrated in FIG. 4a, the array of switches comprises a 5×6 array with a total of 30 switches. In other embodiments, the array of switches may comprise hundreds or even thousands of switches. In embodiments where the total number of switches in the morphable pad 210 is on the order of thousands, each switch is extremely small. For example, in one such embodiment, each switch is 1 millimeter by 1 millimeter in size. The more switches are present in the array, the more fine-grained the morphable pad's 210 reproduction of the user interface will be.

User input may be received by pressing any one of the switches that make up the reproduction of a button of the user interface. In some embodiments, the morphable pad 210 additionally comprises support devices in between each switch such that when multiple switches are adjusted to form a single button, those switches respond uniformly to user pressure input applied to any of the constituent switches.

Associating multiple switches with the same function can be helpful in allowing the user to use multi-touch gestures on a switch or a combination of switches. For example a gesture can include a horizontal swipe of the hand/fingers which represents changing the track on a compact disc (CD) and a vertical swipe can represent a change in volume, etc. In one example embodiment, multiple switches are raised slightly in a donut shaped fashion in order to reproduce the track wheel of an IPOD type device, or other third party device connected to the vehicle via a wire or wirelessly.

Figure 5A:
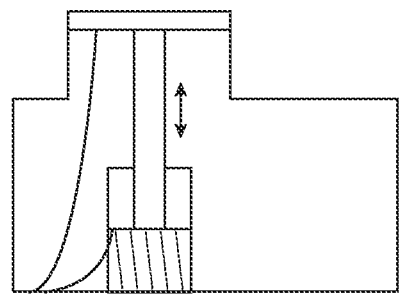
FIGS. 5a, 5b, 5c contains several illustrations of an individual switch (or cell), including a small scale motor switch (FIG. 5a), a piezo switch (FIG. 5b), and electro active polymer switches (FIG. 5c) of a morphable pad, in accordance with one embodiment of the present invention.
Figure 5B:
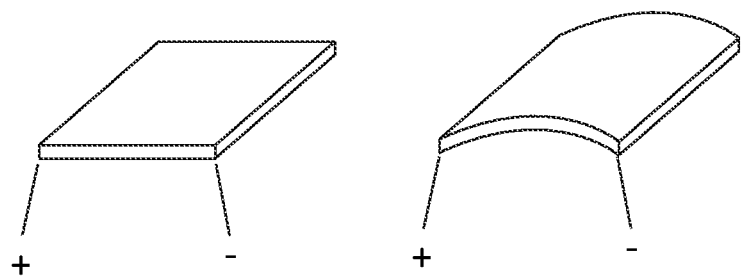
Figure 5C:
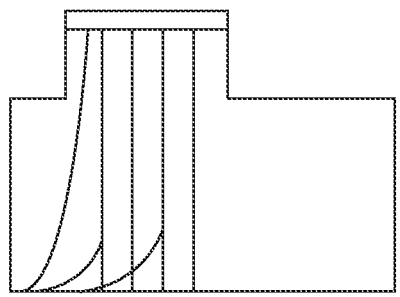

FIGS. 5a, 5b, and 5c contain several illustrations of the individual switches of a morphable pad in accordance with one embodiment of the present invention. Switches may be of variable width, and are capable of achieving variable height or variable surface texture depending upon the embodiment. In one embodiment each switch has a highlight-sensitive portion near the top surface of the switch. Thus, each switch may receive two kinds of input: highlight input and selection input.

Selection input represents tactile input received from a user indicating a selection of an item displayed on the user interface. Each switch of the morphable pad 210 is designed to require a minimum amount of input force as a prerequisite to activate a switch. The resistance of a switch to physical pressure is tuned to this amount of input force, such that when the switch receives the requisite amount of input force, the selection input is received. Selection input requires a minimum amount of force to be activated in order to prevent accidental activation by a user, especially during blind use. In some embodiments, a subsequent depression or "give" of the switch in response to applied pressure provides tactile feedback to the user, providing them with a physical indication that the switch was activated. Switches of a morphable pad 210 are designed to receive selection input in order to activate buttons or controls displayed on the user interface. For example, selection input may alter the state of the stereo, or select a menu within the user interface to access a more detailed control setting.

In some embodiments, the apparatus backing or supporting the switches receives the selection input rather than the switch itself. This supporting apparatus may be a force-sensitive device or surface that is able to detect selection input from multiple switches, and determine from which switch the selection input was received.

Highlight input, in contrast, is used in order to highlight the user interface on the display 220, to serve as a guide for users to correlate the location of their fingers over the morphable pad 210 with controls on the user interface. In one embodiment, the highlight-sensitive portion of the switch is configured to be touch sensitive. The top of the switches may be made touch sensitive via any one of a number of existing mechanisms. Examples of conventional touch sensitive technologies that may be implemented on the switches include resistive, surface acoustic wave, capacitive, infrared, strain gauge, optical imaging, dispersive signal, or acoustic pulse recognition. Further details for each of these technologies are described and shown (respectively) in, U.S. Pat. No. 7,250,940, "Touch Screen Apparatus and Method Therefore" by Jayanetti et al.; U.S. Pat. No. 5,723,934, "Surface Acoustic Wave Position Sensing Device" by Toda; U.S. Pat. No. 4,136,291, "Capacitive Touch-Pad Devices with Dynamic Bias" by Waldron; U.S. Pat. No. 5,162,783, "Infrared Touch Screen Device for a Video Monitor" by Moreno; U.S. Pat. No. 5,241,308, "Force Sensitive Touch Panel" by Young; U.S. Patent Publication No. 2008/0084539, "Human-Machine Interface Device and Method" by Daniel; U.S. Pat. No. 7,315,300, "Touch Sensitive Device Employing Impulse Reconstruction" by Hill et al.; and U.S. Pat. No. 7,265,746, "Acoustic Wave Touch Detection Circuit and Method" by Knowles et al. All of the foregoing are incorporated herein by reference.

In some embodiments, the highlight input is not necessarily performed through a physical touch, but rather through a sensed indication that an object, such as the user's finger or another pointing device, is in close proximity to the switch. In one embodiment, the highlight input is optically sensed. In these cases, the object may be touching the switch, or it may merely be in close proximity to it. In other embodiments, other sensing technologies, such as the ones described above, may be used to detect a highlight input represented by a close proximity of an object to the switch.

The switches may be constructed using several different techniques, of which FIGS. 5a, 5b, and 5c provide several illustrations. Independent of which technique is used to construct the switches, switches are capable of being distinguished from one another by a user through a different tactile feel. In one embodiment, switches are able to achieve a sufficient change in height such that a user would be able to detect, by sense of touch, the change in height of the switch. In another embodiment, switches may be differentiated on the basis of having different surface textures created on the surface of each switch (for example via surface wave acoustics). Selection input is physically distinguishable from highlight input, so that the display and the ECU do not confuse selection input for highlight input. The resistance and depression aspect of a switch may incorporated in the junction between the switch and the morphable pad 210 assembly that houses the switch array. Alternatively, the depression characteristic may be included as part of the switch itself.

Example techniques for the construction of each switch comprise small scale motor switches (FIG. 5a), piezo switches (FIG. 5b), electro active polymer switches (FIG. 5c), or acoustic standing waves (not shown). Motor switches include a small piston that is driven over a distance by a small scale motor. The piston raises or lowers the switch responsive to the electric current applied to the motor over a set a wires. Examples of motors that could be used to implement motor switches include SQUIGGLE motors.

Piezo switches are made of piezoelectric ceramic materials that deform in a particular direction based on an applied to electric charge. In some embodiments, piezo switches are combined with hydraulics that magnify the displacement of the piezos.

Electro active polymers are polymers that deform in a direction based on an applied electric charge or electric field. They generally deform a larger amount than piezo switches, and can be used in implementations where the desired switch height deformation range is larger. In some embodiments making use of electro active polymers, each switch has separate electro active polymers that make up each switch. In other embodiments, the array of switches comprises a single array of electro active polymers, where individual regions of the array can be separately activated to act as individual switches.

Surface acoustic waves reproduce physical textures that can be sensed by human touch without actually deforming the surface of the morphable pad 210. For example, surface acoustic waves can be used to reproduce the tactile sensation a person would feel when touching wood or metal. Switches implemented using surface acoustic waves on the surface of the switch do not change height as required by the other types of switches described above. Rather, surface acoustic wave switches change the texture of sections of the morphable pad responsive to the layout of the user interface. In these embodiments, the array of switches is instead a surface spanning the morphable pad 210. Rather than raising or lowering individual switches, the surface of the morphable pad 210 comprises different standing acoustic waves that represent in texture the different buttons and controls of the user interface. For example, by making some portions of the surface rough and other portions smooth, the standing acoustic waves can replicate the user interface.

In other embodiments, switches may be constructed out of shape memory alloys or liquid crystal elastomers. Further details for each of these technologies are described and shown (respectively) in, U.S. Pat. No. 5,410,290, "Shape Memory Alloy Relays and Switches" by Cho; U.S. Pat. No. 7,116,857, "Optomechanical Switch using Laser or Light Movable Liquid Crystal" by Faris. All of the foregoing are incorporated herein by reference.

In one embodiment, the morphable pad 210 is replaced in the vehicle by a remote touch screen (not shown) that is capable of receiving highlight input and selection input, but does not morph to recreate the layout of the user interface. In this embodiment, received highlight input provides visual feedback on the display 220, rather than tactile feedback being provided through the tactile feedback of the morphable pad 210. The remote touch screen receives highlight and input and selection input from a user, and communicates that input to the remainder of the system to adjust the user interface and/or car feature controls as described herein.

Figure 6:
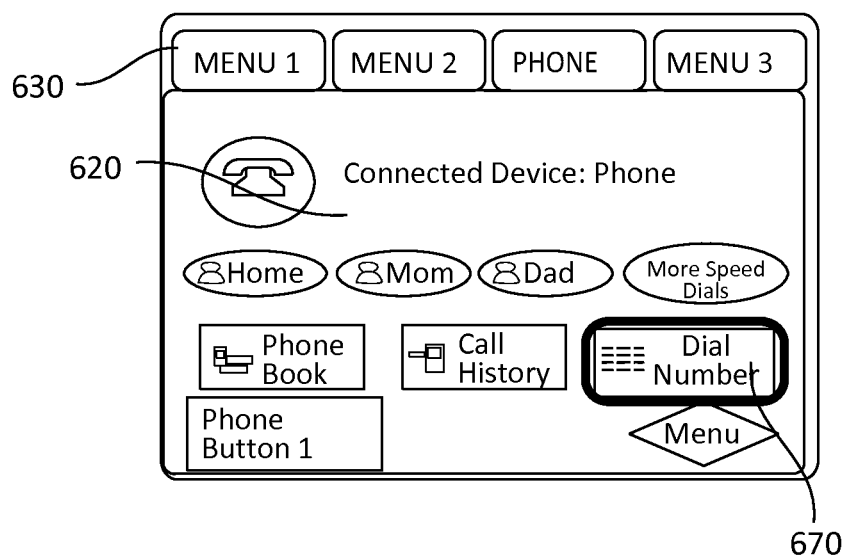
FIG. 6 is an illustration of how the layout of a morphable pad matches the user interface displayed on a display in accordance with one embodiment of the present invention.
Figure 6:
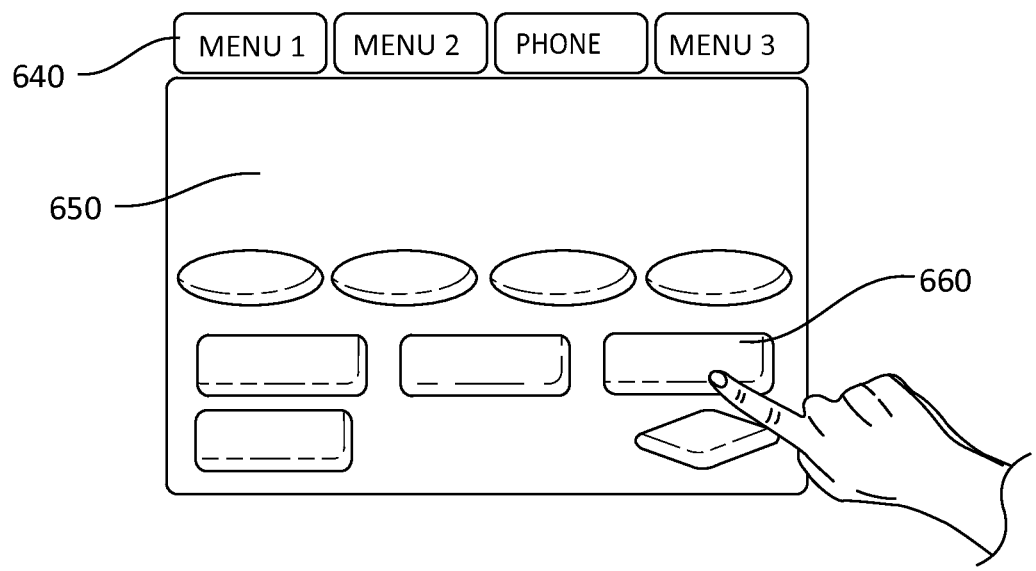

FIG. 6 is an illustration of how the morphable pad matches the layout of the user interface displayed on a display in accordance with one embodiment of the present invention. In the example embodiment of FIG. 6, the user interface covers the majority of the left side of the display 620. The morphable pad 650 matches the displayed layout of the user interface. The morphable pad 650 is capable of replicating all of the display, or only those portions of the display that have controls or settings for car features.

In the example of FIG. 6, a portion of the display comprises navigation buttons 630 to facilitate easy navigation of the user interface. In some embodiments, these navigation buttons 630 are reproduced as navigation buttons 640 on the morphable pad 650 as if they were any other button or control. In other embodiments, the navigation buttons 640 are separate from the morphable pad 650, to serve as a fixed guide for the user to assist in navigation of the user interface. In these embodiments, the navigation buttons 640 are made of separate switches not part of the morphable pad 640. They also may include fixed text indicating their function. For example, the buttons may include the text "MENU 1," "MENU 2," "PHONE," and "MENU 3" to better illustrate their function.

A user's highlight input 660 is displayed on the morphable pad 650. Corresponding to this highlight input 660, FIG. 6 illustrates how the "Dial Number" button 670 on the display 620 is highlighted to provide the user a guide as to which button they are currently touching. Although a user may operate the morphable pad 650 by blind control, it may be necessary to glance at the display 620 to provide visual confirmation of the user's hand position on the morphable pad 650. By matching the highlight input 660 to a highlight on the user interface 670, the user is provided feedback and can better learn to use the morphable pad by blind control.

Note that the highlighting of the user interface may be a function performed by the user interface, or it may be a function performed by the display. Highlighting may involve changing the brightness of a particular portion of the user interface. Highlighting may also involve altering the colors of the portion of the user interface to be highlighted. For example, if a button is to be highlighted, the button may be changed in color and/or brightness. Additionally, in some embodiments the area around the highlighted button may be altered in color or brightness as well.

Figure 7:
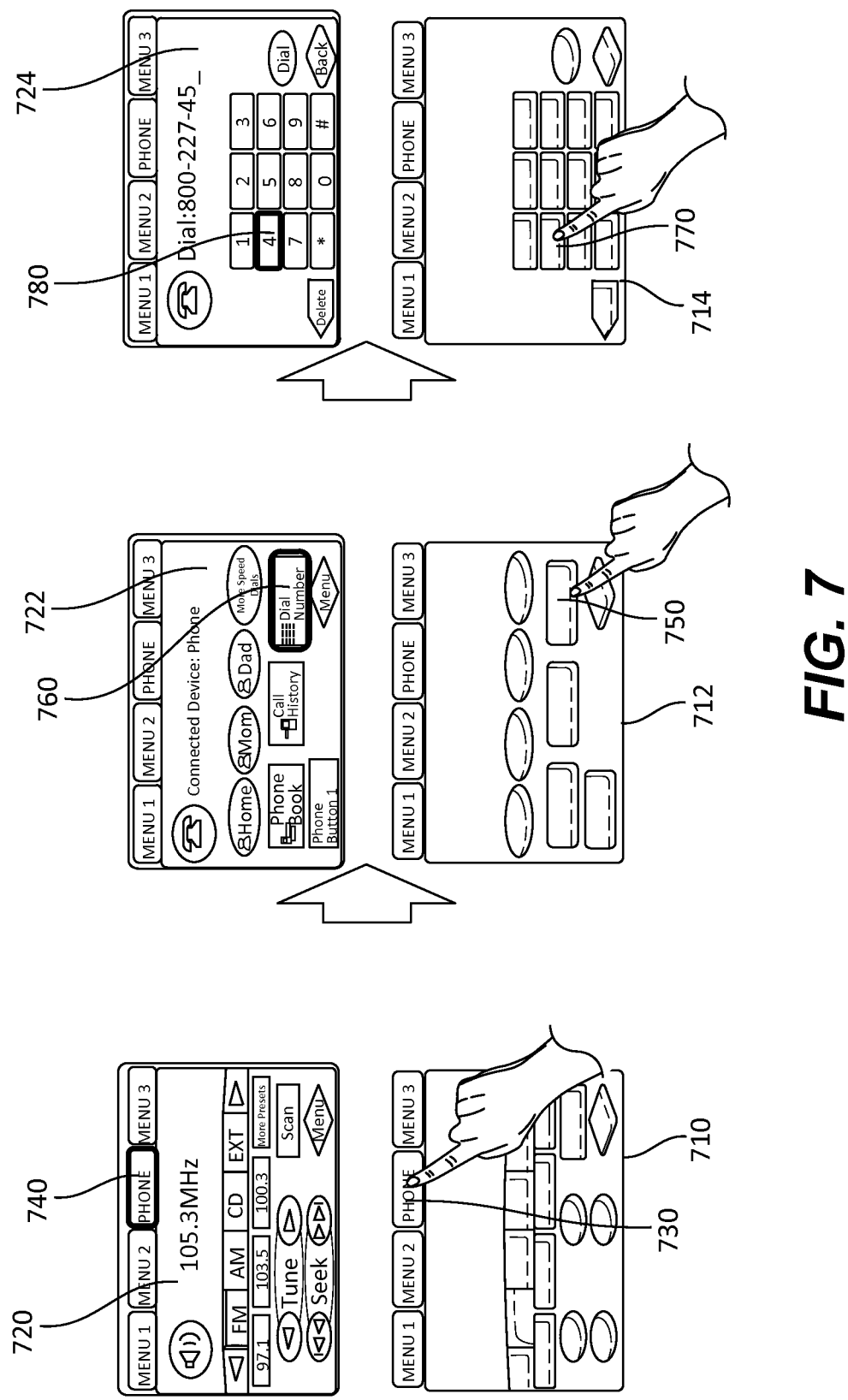
FIG. 7 is an illustration of a use case of a user interacting with the morphable pad and the display altering the user interface to match the input received at the morphable pad in accordance with one embodiment of the present invention.

FIG. 7 is an illustration of a use case of a user interacting with the morphable pad and the display altering the user interface to match the input received at the morphable pad in accordance with one embodiment of the present invention. In FIG. 7, a morphable pad 710 and user interface 720 are manipulated to make use of a telephone feature.

The use case starts by initializing the morphable pad 710 and user interface 720 to match each other. In this use case, it is assumed the user has previously navigated to the car stereo portion of the user interface 720 after the initialization. The morphable pad 710 receives highlight input on a "PHONE" button 730. In this example, the "PHONE" button is a part of the user interface 720 and also part of the morphable pad 710. The portion of the user interface 720 corresponding to the "PHONE" button 740 is highlighted responsive to the highlight input 730 at the morphable pad 710. Responsive to receiving selection input on that button, the user interface 720 is adjusted to the user interface 722. Here, the phone related options are shown because the user selection input was received from the portion of the morphable pad 730 corresponding to the "PHONE" button 740. The morphable pad 710 reconfigures the layout 712 of the buttons of morphable pad 710 to match the user interface 722.

User highlight input is received 750 highlighting the button corresponding to the "Dial Number" option 760 on the user interface 722. Responsive to receiving selection input, the display 720 again changes the user interface 724. Now, the user interface 724 displays a number dialing interface. The morphable pad 710 again reconfigures the layout 714 of the buttons of the morphable pad 710 based on the user interface 724. User highlight input is received 770 highlighting the button corresponding to the "4" option 780 on the user interface 724.

It is contemplated in this example that several numbers have already been entered, comprising "800 227 45" prior to a "4" selection input in this example. This illustrates that some selection inputs do not alter the layout of the user interface, but instead result in a change in the settings of a car feature. In this case, the entry of a phone number will cause the associated telephone to call the entered number. Whether the layout of the user interface changes responsive to selection input depends on the feature.

Figure 8:
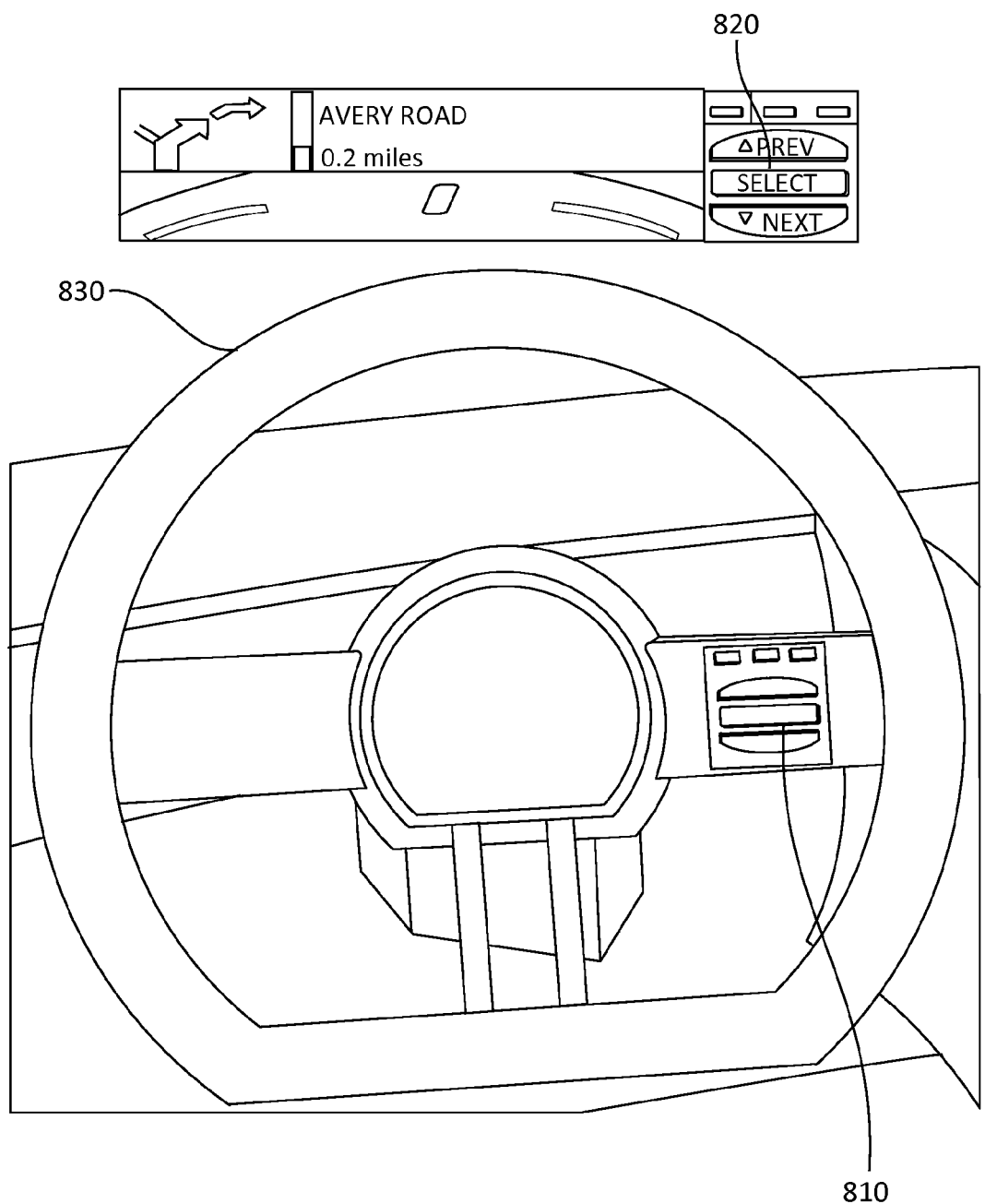
FIG. 8 is an illustration of an alternative embodiment of the present invention, wherein a morphable pad is located on a steering wheel of a car, and a display is located on a heads up display or in the space immediately behind the steering wheel near the traditional instrument cluster.

FIG. 8 is an illustration of an alternative embodiment of the present invention, wherein a morphable pad is located on a steering wheel of a car, and a display is located on a heads up display or in the space immediately behind the steering wheel near the traditional instrument cluster. In one embodiment, the display is heads up display that appears on the windshield of the vehicle.

In this embodiment, a steering wheel 830 comprises a morphable pad 810 embedded in the steering wheel 830. The morphable pad 810 may be installed anywhere on the surface of the steering wheel. The display 820 may be a heads up display projected or embedded on the front windshield of the car. Alternatively, the display 820 may be located in the space immediately behind the steering wheel. In some embodiments, the display 820 will be part of a larger display device comprising information from gauges such as an odometer or speedometer. In other embodiments, the display 820 will be located in proximity to these instruments or in the center console display 220.

Figure 9:
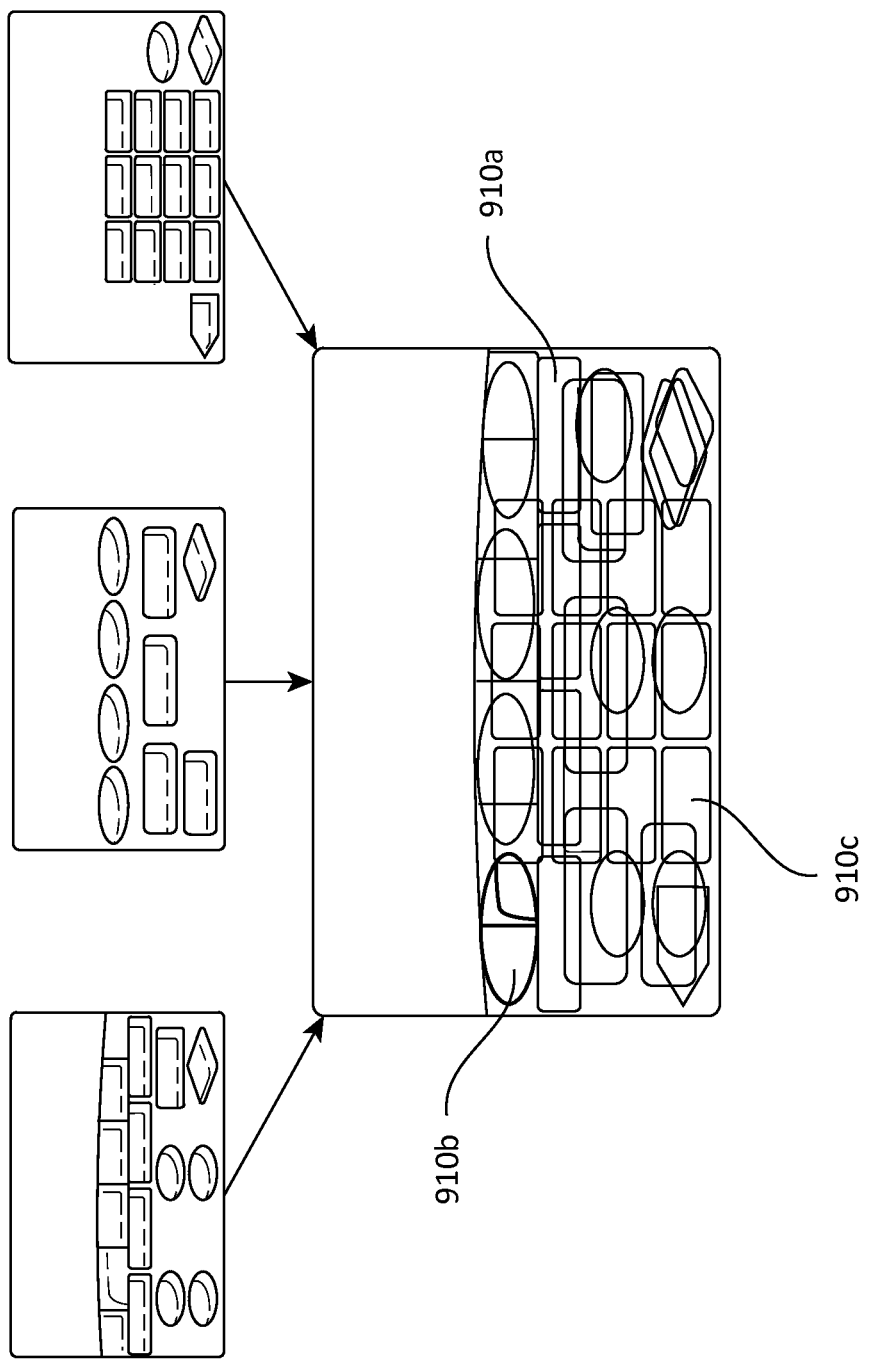
FIG. 9 is an illustration of another alternative embodiment of the present invention, wherein a morphable pad is comprised of fixed segment switches.

FIG. 9 is an illustration of another alternative embodiment of the present invention, wherein a morphable pad is comprised of fixed "segment" type switches 910. In this embodiment, the morphable pad is made up of fewer, larger switches that cover larger segments of the morphable pad. Each segment switch 910 is associated with a single function or a portion of a function from the user interface, and is raised or lowered whenever that function is being used. The switches in this embodiment are referred to as "segment" switches 910 because the shape of each switch is may be tailored to its associated function from the user interface, in order to reduce the overall cost or complexity of the morphable pad. For example, if the user interface displays an oval shaped button that is associated with a particular car feature, the three switches 910b corresponding to that feature on the morphable pad will be raised or lowered together in order to reproduce the oval shape of that user interface button. As the switches are tied to particular functions, depending upon the user interface, it may be the case that there are portions of the morphable pad that do not have any switches associated with them. In these areas, a flat surface material such as plastic is used to provide a contrast to raised switches. Thus, in this embodiment, the morphable pad is not a uniform array of identically shaped switches, but rather a patchwork of segment switches 910 that cover differing amounts of the surface of the morphable pad.

Figure 10:
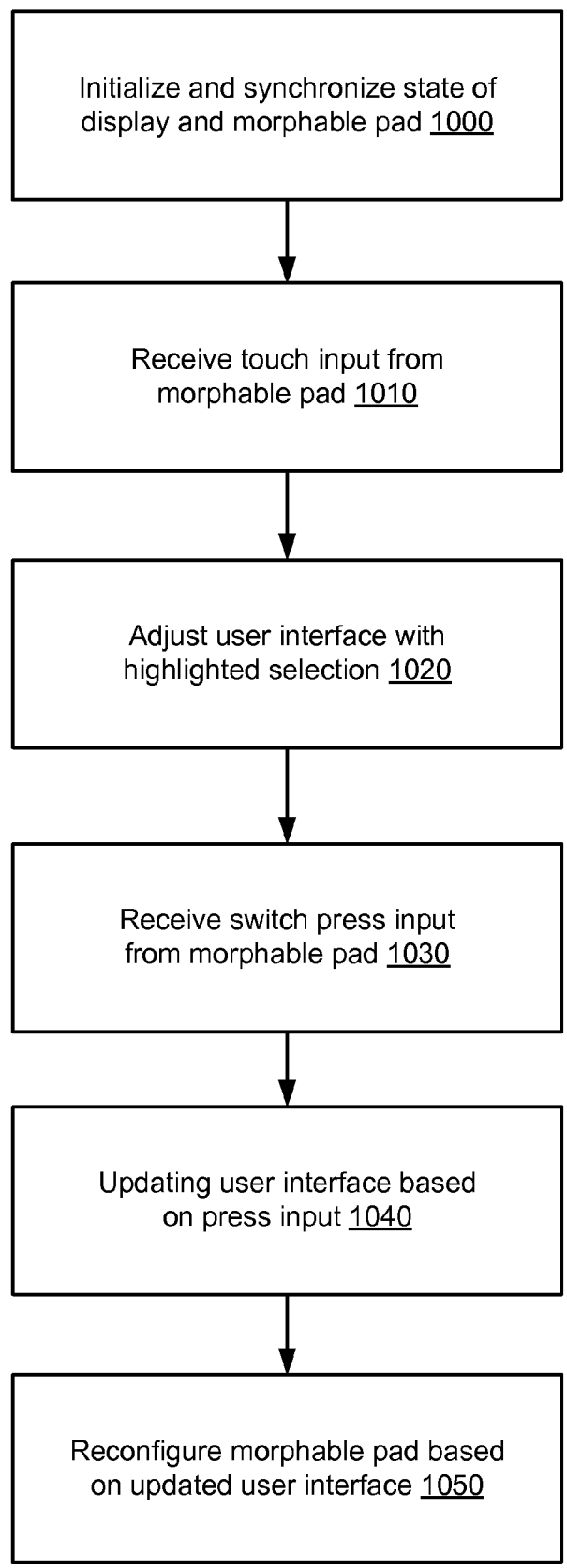
FIG. 10 is a flow chart illustrating a morphable pad receiving input to adjust car features and a display adjusting a user interface to match the received input in accordance with one embodiment of the present invention.

FIG. 10 is a flow chart illustrating how a morphable pad receives input to adjust car features and a display adjusts a user interface to match the state of the morphable pad in accordance with one embodiment of the present invention.

The process starts by initializing and synchronizing 1000 the states of the display and morphable pad, such that the user interface displayed on the display matches the height of the switches of the morphable pad. The morphable pad receives 1010 highlight input from the morphable pad. Highlight input is transmitted to the display. The user interface is adjusted 1020 to highlight the section of the user interface associated with the highlight input. The morphable pad receives 1030 selection input from the morphable pad, corresponding a selection by the user of regarding the user interface or a car feature setting. The selection input is transmitted to the display. The user interface is updated 1040 based on the selection input. The morphable pad is then reconfigured 1050 based on the updated user interface. Further, if the selection input was a setting change of a car feature, the ECU adjusts that particular car feature responsive to the selection input.

Additional Considerations

Vehicles implementing embodiments of the present invention include at least one computational unit, e.g., a processor having storage and/or memory capable of storing computer program instructions that when executed by a processor perform various functions described herein, the processor can be part of an electronic control unit (ECU).

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions could be embodied in software, firmware or hardware, and when embodied in software, could be downloaded to reside on and be operated from different platforms used by a variety of operating systems. An embodiment can also be in a computer program product which can be executed on a computing system.

An embodiment also relates to an apparatus for performing the operations herein. This apparatus may be specially constructed for the purposes, e.g., a specific computer in a vehicle, or it may comprise a general-purpose computer selectively activated or reconfigured by a computer program stored in the computer, which can also be positioned in a vehicle. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, an embodiment is not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses without departing from the spirit and scope of the embodiments.

What is claimed is:

1. A method of controlling a vehicle comprising a morphable pad having an array of switches, and a display displaying a user interface, the method comprising:
   configuring a first subset of the array of switches based on a first layout the user interface;
   receiving a selection input using the first subset of the array;
   updating the first layout of the user interface to a second layout of the user interface based on the selection input; and
   reconfiguring the first subset of the array of switches to a second subset of the array of switches responsive to the updating of the first layout of the user interface to the second layout, the second subset of the array of switches based on the second layout of the user interface.

2. The method of claim 1 wherein configuring a tactile feel of at least some of said array of switches further comprises:
   adjusting upward in height those switches in said array of switches associated with vehicle features controls in said user interface.

3. The method of claim 1 wherein configuring a tactile feel of at least some of said array of switches further comprises:
   adjusting in surface texture those switches in said array of switches associated with vehicle features controls in said user interface.

4. The method of claim 1 wherein updating the layout of said user interface based on the selection input further comprises:
   correlating the selection input with a selected vehicle feature control displayed as part of the layout of vehicle feature controls on said user interface;
   retrieving from a storage a new layout of vehicle control features for said user interface based on the selected vehicle feature control; and
   displaying the new layout of said user interface on said display.

5. The method of claim 1 wherein reconfiguring the tactile feel of at least some of said array of switches further comprises:
   determining whether a portion of the updated layout of said user interface corresponds to a vehicle feature control; and responsive to determining that the portion corresponds to a vehicle feature control, modifying a tactile feel of a first switch in said array of switches that matches the vehicle feature control.

6. The method of claim 1 further comprising modifying a vehicle feature setting based on the selection input.

7. The method of claim 1 wherein each switch in said array of switches is less than or equal to one millimeter in length or width.

8. The method of claim 1 wherein each switch is capable of sufficient adjustment in tactile feel such that the change in tactile feel may be detected by sense of human touch relative to an adjacent unadjusted switch.

9. The method of claim 1 wherein said morphable pad is located on a steering wheel of a vehicle.

10. The method of claim 1 further comprising:
receiving a highlight input at a switch of said array of switches; and
adjusting said user interface to highlight the portion of the layout of vehicle feature controls associated with the switch that received the highlight input.

11. The method of claim 1 wherein said morphable pad is located on the center console of a vehicle.

12. The method of claim 1 wherein each switch in said array of switches comprises a micro motor.

13. The method of claim 1 wherein each switch in said array of switches comprises a piezoelectric material.

14. The method of claim 1 wherein each switch in said array of switches comprises an electro-active polymer.

15. A system for controlling vehicle feature settings comprising:
a display displaying a user interface comprising a layout of vehicle control features, the display configured to update the layout based on a received selection input; and
a morphable pad connected to the display and comprising an array of switches, each switch configured to receive the selection input, the switches configured to adjust in tactile feel to match the layout, and to reconfigure in tactile feel responsive to a change in the layout.

16. The system of claim 15 wherein a switch is further configured to adjust upward in height responsive to being associated with a vehicle feature control displayed in the layout.

17. The system of claim 15 wherein a switch is further configured to adjust in surface texture responsive to being associated with a vehicle feature control displayed in the layout.

18. The system of claim 15 further comprising:
an electronic control unit (ECU) connected to the display and the morphable pad, the ECU configured to correlate the received selection input with a selected vehicle feature control displayed in the layout;
a storage connected to the ECU, the storage configured to store a new layout of vehicle control features for the user interface related to the selected vehicle feature control; and
the display further configured to display the new layout of the user interface.

19. The system of claim 18 wherein the ECU is further configured to reconfigure the tactile feel of at least some of the array of switches responsive to the display displaying the new layout.

20. The system of claim 18 wherein the ECU is further configured to:
determine whether a portion of the new layout corresponds to a vehicle feature control; and
responsive to determining that the portion corresponds to a vehicle feature control, to modify a tactile feel of a first switch in the array of switches that matches the vehicle feature control.

* * * * *

UNITED STATES PATENT AND TRADEMARK OFFICE
CERTIFICATE OF CORRECTION

PATENT NO. : 9,529,499 B2
APPLICATION NO. : 14/564882
DATED : December 27, 2016
INVENTOR(S) : Nicholas A. Scheufler et al.

It is certified that error appears in the above-identified patent and that said Letters Patent is hereby corrected as shown below:

In the Claims

Starting at Column 12, Line 39 the claims are corrected to read:

2. The method of claim 1, wherein configuring the first subset of the array of switches further comprises:
    adjusting upward in height the switches in the first subset of the array of switches in the first layout of the user interface.

3. The method of claim 1, wherein configuring the first subset of the array of switches further comprises:
    adjusting in surface texture of the switches in the first subset of the array of switches in the first layout of the user interface.

4. The method of claim 1, wherein updating the first layout of the user interface to the second layout of the user interface based on the selection input further comprises:
    correlating the selection input with a selected button displayed as part of the first layout of the user interface;
    retrieving, from a non-transitory storage medium, the second layout of the user interface based on the selected button; and
    displaying the second layout of the user interface on the display.

5. The method of claim 1, wherein reconfiguring the first subset of the array of switches further comprises:
    determining whether a portion of the second layout of the user interface corresponds to a button; and
    responsive to determining that the portion corresponds to a button, modifying the array of switches to match the vehicle button.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*

6. The method of claim 1, further comprising modifying a vehicle feature setting based on the selection input.

7. The method of claim 1, wherein each switch in the array of switches is less than or equal to one millimeter in length or width.

8. The method of claim 1, wherein each switch of the array of switches is capable of sufficient adjustment such that a change may be detected by sense of human touch relative to an adjacent unadjusted switch.

9. The method of claim 1, wherein said morphable pad is located on a steering wheel of a vehicle.

10. The method of claim 1, further comprising:
    receiving a highlight input at a switch of the array of switches; and
    adjusting the user interface to highlight the portion of the layout associated with the switch that received the highlight input.

11. The method of claim 1, wherein said morphable pad is located on the center console of a vehicle.

12. The method of claim 1, wherein each switch in said array of switches comprises a micro motor.

13. The method of claim 1, wherein each switch in said array of switches comprises a piezoelectric material.

14. The method of claim 1, wherein each switch in said array of switches comprises an electro-active polymer.

15. A system for controlling a vehicle comprising:
    a display displaying a user interface comprising a first layout, the display configured to update the first layout to a second layout based on a received selection input; and
    a morphable pad connected to the display and comprising an array of switches, the switches configured to adjust to a first subset of switches matching the first layout, each switch of the first subset configured to receive the selection input, the array of switches reconfigurable to match the second layout responsive to the selection input received at the first layout.

16. The system of claim 15, wherein a switch is further configured to adjust upward in height responsive to being associated with a button displayed in either of the first layout or the second layout.

17. The system of claim 15, wherein a switch is further configured to adjust in surface texture responsive to being associated with a button displayed in at least one of the first layout and the second layout.

18. The system of claim 15, further comprising:

an electronic control unit (ECU) connected to the display and the morphable pad, the ECU configured to correlate the received selection input with a selected button displayed in at least one of the first the layout and the second layout;

a non-transitory storage medium connected to the ECU, the non-transitory storage medium configured to store a new layout for the user interface related to the selected button; and the display further configured to display the new layout of the user interface.

19. The system of claim 18, wherein the ECU is further configured to reconfigure at least some of the array of switches responsive to the display displaying the new layout.

20. The system of claim 18, wherein the ECU is further configured to:
determine whether a portion of the new layout corresponds to a button; and
responsive to determining that the portion corresponds to a button, modify a first switch in the array of switches that matches the button.